Patented Mar. 31, 1925.

1,531,336

UNITED STATES PATENT OFFICE.

BIRGER FJELD HALVORSEN, OF CHRISTIANIA, HANS JOACHIM FALCK, OF NOTODDEN, THOR MEJDELL, OF SKOIEN, NEAR CHRISTIANIA, AND ØYSTEIN RAVNER, OF CHRISTIANIA, NORWAY, ASSIGNORS TO NORSK HYDRO-ELEKTRISK KVAELSTOFAKTIESELSKAB, OF CHRISTIANIA, NORWAY.

PROCESS FOR THE TREATMENT OF LEUCITE.

No Drawing. Application filed April 10, 1924. Serial No. 705,692.

*To all whom it may concern:*

Be it known that we, BIRGER FJELD HALVORSEN, HANS JOACHIM FALCK, THOR MEJDELL, and ØYSTEIN RAVNER, citizens of the Kingdom of Norway, residing at Christiania, Notodden, Skoien, near Christiania, and Christiania, respectively, Norway, have invented certain new and useful Improvements in Processes for the Treatment of Leucite, of which the following is a specification.

Leucite has already been suggested as a raw material both for potassium compounds and for aluminium compounds. It has also been utilized, finely pulverized, as a fertilizer. The most likely way of extracting the potassium and aluminium compounds contained in the leucite, is to treat the latter with acid. Nitric acid seems to be specially efficient for this purpose, and experiments with it have previously been conducted. One finds, for instance, in B. Dammer and O. Tietze "Die Nutzbaren Mineralien" Vol. II, page 295, that it has been tried in Italy. The leucite was dissolved in nitric acid and heated to such a degree that the nitrate of aluminium was decomposed, whereby a great quantity of the nitric acid, however, also became decomposed. In order to avoid this it is suggested that the nitrate of aluminium together with chloride of potassium be converted into chloride of aluminium and nitrate of potassium. It seems that there have been certain drawbacks in these processes and that consequently they have never been effected on a large scale.

Aluminium and potassium compounds can advantageously be prepared from leucite with the aid of nitric acid, when the process given below is adopted. Mixtures of salts of such a high degree of purity are then obtained that pure alumina, which is serviceable for the manufacture of aluminium, and pure nitrate of potassium can be extracted from them without further purifying processes.

The process can be effected as follows:

Crushed leucite, which has already been advantageously freed as much as possible from iron compounds and other admixtures, is dissolved in dilute nitric acid. Aluminium and potassium are dissolved in the form of nitrates, while the silicic acid is left behind in a granulous state that is easy to filter. The dissolving process is quickly and easily performed when the compound is heated. The acid liquor is now treated in a way that differs according to the content of free acid. In order to neutralize this free acid further quantities of finely pulverized leucite can, as a matter of fact, be added when the leucite is decomposed. With such finely pulverized leucite it is possible to neutralize all the free acid and even make the solution basic as far as alumina is concerned. The neutralization can also be effected by adding lime, ammonia, potash, soda lye &c. Ammonia can also be produced from the liquid itself by the electrolysis of the nitrates. It is more practical, however, to use basic nitrate of aluminium, which is produced at a later stage in the process. It is evident that also other bases can be used, and for this purpose potassium compounds are specially adaptable, as by this means other metals are not brought into the solution. The neutralizing of the free acid with bases is not, however, absolutely necessary, as neutralization will be obtained when the solution is evaporated, as the nitric acid is dispelled together with the water (steam) by the succeeding evaporation, if the liquid is too acid. The evaporation is effected in an acidproof apparatus and is continued long enough to ensure that mixed crystals of nitrate of potassium and nitrate of aluminium with crystal water of an average composition of $KNO_3.Al(NO_3)_3.9H_2O$ are precipitated, when the concentrated liquid is cooled. When the crystallization is performed in a solution that is basic or neutral as far as alumina is concerned, pure crystals of the above mentioned mixture will be obtained, that are suitable as material for the production of pure alumina and pure nitrate of potassium. Re-crystallization in a solution that is basic as regards alumina produces, at all events, crystals that fulfil the strictest requirements as far as purity with regard to iron is concerned. By evaporation of the mother lye from the first crystallization, further quantities of mixed salts are obtained. As this fraction is not quite pure it is returned to the process and the mother liquor is worked on separately for the purpose of making it into a fertilizer.

In this manner about 90% of the content of potassium and alumina in the leucite can be extracted. When using this method a mixture of crystals is obtained that is specially free of iron and iron compounds.

Examples of how the process can be performed follow:

1000 kilogrammes of crushed leucite containing 190 kilos of alumina ($Al_2O_3$) and 177 kilos of potassium oxide ($K_2O$) is treated at a temperature of 100° C. for 4 hours with 3500 kilos of 30% nitric acid. The bases of the leucite become dissolved and a solution of 3800 kilos is obtained containing 60 kilos of free nitric acid. This solution is then treated according to one or other of the following processes:

(1) 120 kilos of carbonate of potash ($K_2CO_3$) is added, whereby the solution is made to contain a superfluity of bases of 5%. The solution is filtered and evaporated to a boiling point of 127° C., after which it is cooled to 25° C. 1070 kilos of a salt mixture is then crystallized which chiefly consists of $KNO_3Al(NO_3)_3 9H_2O$. These crystals contain small quantities only of iron, so that pure alumina can be made from them without further purifying processes.

(2) 1200 kilos of the acid solution is evaporated until it contains 14% calculated as $Al_2O_3$. Besides water, 100 kilos of nitric acid is evaporated away. The solution that has been evaporated is then added to the rest of the acid solution (2300 kilos), whereby the total content of bases will exceed the total content of acid by 5%. The basic solution is then treated as stated in example 1.

(3) 140 kilos of basic nitrate of aluminium ($Al(OH)_2NO_3$) containing 25% $Al_2O_3$ and 37% of $HNO_3$ is added to the acid solution. The solution will then contain 1% more base than the total content of acid. The solution is then filtered and treated as stated in example 1.

In the above examples the quantity of salt that is crystallized is 60% of the content. Another 30% can be obtained by evaporating the mother lye to 127° C. and cooling it to 25° C. This is repeated several times, whereby another 635 kilos of the salt mixture is obtained. As this is not quite so free of iron it is worked separately on pure crystals according to well known methods.

We claim:

1. The process of treating leucite which comprises dissolving the leucite in dilute nitric acid and neutralizing the acid solution obtained thereby, evaporating and cooling so that mixed crystals of nitrate of potassium and nitrate of aluminium are precipitated that have an average content equal to $KNO_3Al(NO_3)_3 9H_2O$.

2. The process of treating leucite which comprises dissolving the leucite in dilute nitric acid and neutralizing the acid solution obtained thereby so that it contains a superfluity of bases, evaporating and cooling, so that mixed crystals of nitrate of potassium and nitrate of aluminium are precipitated that have an average content equal to $KNO_3Al(NO_3)_3 9H_2O$.

3. The process of treating leucite which comprises dissolving the leucite in dilute nitric acid and neutralizing the acid solution obtained thereby, with a solution of basic nitrate of aluminium, evaporating and cooling, so that mixed crystals of nitrate of potassium and nitrate of aluminium are precipitated that have an average content equal to $KNO_3Al(NO_3)_3 9H_2O$.

4. The process of treating leucite which comprises dissolving the leucite in dilute nitric acid, boiling a part of the acid solution obtained thereby so that it contains less $NO_3$ than corresponds to the content of Al, using this basic solution for neutralizing the rest of the solution, evaporating and cooling, so that mixed crystals of nitrate of potassium and nitrate of aluminium are precipitated that have an average content equal to $KNO_3Al(NO_3)_3 9H_2O$.

In testimony whereof, we affix our signatures.

BIRGER FJELD HALVORSEN.
HANS JOACHIM FALCK.
THOR MEJDELL.
OYSTEIN RAVNER.